United States Patent [19] [11] 4,230,081
Meek [45] Oct. 28, 1980

[54] SYSTEM FOR IMPROVING INTERNAL COMBUSTION ENGINE FUEL EFFICIENCY

[76] Inventor: James S. Meek, 3303 Lockwood Dr., Chattanooga, Tenn. 37415

[21] Appl. No.: 52,671

[22] Filed: Jun. 27, 1979

[51] Int. Cl.³ .......................................... F02M 31/00
[52] U.S. Cl. .................................. 123/555; 123/557; 123/556
[58] Field of Search ............... 123/122 D, 122 E, 133, 123/122 C, 124 R, 119 D; 261/144, 145

[56] References Cited
U.S. PATENT DOCUMENTS

| | | | |
|---|---|---|---|
| 1,445,511 | 2/1923 | Herrin | 123/122 E |
| 3,656,462 | 4/1972 | Bailey | 123/122 D |
| 4,106,453 | 8/1978 | Burley | 123/122 C |
| 4,188,928 | 2/1980 | Faustinos | 123/122 D |

Primary Examiner—Ronald H. Lazarus
Attorney, Agent, or Firm—Alan Ruderman

[57] ABSTRACT

A motor vehicle internal combustion engine having a pair of heat risers on the exhaust manifold and a plenum chamber positioned about the carburator fuel reservoir. Air from one of the heat risers is directed into the front of the air cleaner assembly. Air from the other heat riser is directed into the plenum where it preheats the fuel in the reservoir, and then exhaust into the air cleaner assembly where it is mixed with the air received from the first heat riser. Significant savings in fuel consumed by the engine have been noted by thus preheating the air and the fuel without vapor lock occurrences.

3 Claims, 4 Drawing Figures

U.S. Patent  Oct. 28, 1980  Sheet 1 of 2  4,230,081

SYSTEM FOR IMPROVING INTERNAL COMBUSTION ENGINE FUEL EFFICIENCY

BACKGROUND OF THE INVENTION

This invention relates to a method and apparatus for improving the fuel efficiency of internal combustion engines and more particularly to such improvements by preheating the liquid fuel and the air prior to entry into the metering device and the manifold.

Much effort has been directed recently toward providing greater efficiencies in motor vehicle internal combustion engine fuel utilization. It is known that greater efficiencies are attained when the fuel is fully vaporized and mixed with the air prior to combustion. Various heat exchange arrangements have been proposed generally utilizing the heat of the exhaust manifold to vaporize the fuel. One such arrangement is proposed in U.S. Pat. No. 4,106,453 in which vaporized fuel, and air heated by exchange with the exhaust manifold, are mixed in a chamber having a turbulence creating mixing cone. As exemplified by this patent various modifications to conventional automobile engine fuel systems are required with proposals of this type. Another such proposal is disclosed in U.S. Pat. No. 3,886,919 which meters fuel through a valve, heats the fuel and air in an exhaust heat gas exchanger, mixes the fuel and air and directs the mixture into the intake manifolds.

One difficulty encountered with systems which preheat the fuel to high temepratures is that the fuel vapor pressure is increased and the fuel vaporizes prior to entry into the carburator air flow. If vaporizaton occurs in the feed lines or in the carburator float bowl, the flow of fuel is reduced below that demanded by the engine and the engine will vapor-lock and stall. For this reason high fuel temperatures are avoided, and especially with carburator systems.

It is therefore desireable that the fuel be preheated so that it may be more readily atomized and vaporized, but not heated to too high a temperature prior to entry into the carburator, least vapor-lock will occur. In U.S. Pat. No. 3,672,342 the air in the air cleaner is heated by a heat riser from the exhaust manifold and used to heat the fuel passing through a heat exchanger within the air cleaner. Both the air and the fuel are maintained within a temperature range up to 110° F. Since the fuel is heated within the air cleaner and still has a significant distance to flow to the carburator, vapor-lock conditions would be present if the temperature increased greatly. The desireability of preheating the fuel must therefore be counter-balanced by the problems created by over-heating it and effecting vaporization too early. Moreover, for similar reasons of fuel economy the desireability of preheating the air with which the fuel is mixed is well established. The means for effecting the proper heating conditions must be inexpensive, safe, simple and easy to install especially if such systems are to be retro-fitted to existing engines.

SUMMARY OF THE INVENTION

The present invention meets these criteria and provides a significant savings in fuel economy. The fuel and the air are separately pre-heated, the fuel being heated at the carburator fuel reserve bowl which is at least partly encased within a plenum chamber which is supplied with heated air. The heated plenum chamber receives heated air drawn from an exhaust manifold heat riser box and exhausts the air to the air cleaner assembly, preferably at the conventional entry of the heat riser. The air cleaner also receives heated air drawn directly from another exhaust manifold heat riser box. Thus, with only the addition of a heat plenum clamped about the fuel reserve bowl, and an additional heat riser leading to the plenum and a conduit for exhausting from the plenum to the air cleaner the invention provides substantial fuel savings.

The carburator fuel reserve bowl is the final location in the fuel path of liquid fuel prior to entry into the carburator air stream. This, together with the lower vaporization of the fuel because of the temperatures to which the fuel bowl is subjected, effectively eliminates vapor-lock. The heated fuel is partially vaporized as it enters the pre-heated carburator air stream where the liquid fuel is further broken up, atomized and vaporized to a further extent on its path to the intake manifold. In extensive testing of a vehicle modified as described, both the temperature of the liquid fuel in the reserve bowl and the combined temperature of the preheated air in the air cleaner assembly ranged between approximately 145° F. to 230° F., and average fuel savings of approximately 34% during normal city driving conditions were experienced.

Consequently, it is a primary object of the present invention to provide an internal combustion engine with improved fuel efficiency without vapor-lcoking.

It is another object of the present invention to provide in an internal combustion engine a preheated air supply and a preheated liquid fuel supply which is partially vaporized prior to entering the air supply.

It is a further object of this invention to provide a preheated air supply and a preheated liquid fuel supply to an internal combustion engine by utilization of the heat removed from the exhaust manifold.

It is a still further object of this invention to preheat the fuel supplied to an internal combustion engine at the carburator fuel reservoir.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
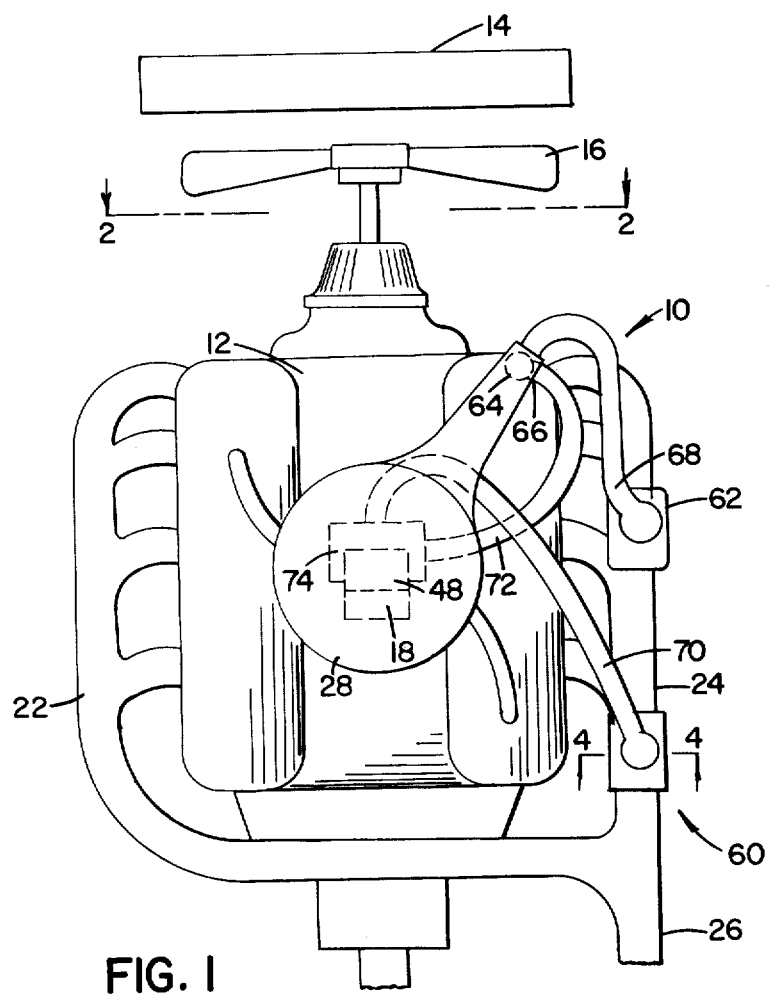
FIG. 1 is a top plan view of a conventional automobile internal combustion engine but modified to include a fuel and air preheating system constructed in accordance with the principles of the present invention.
Figure 2:
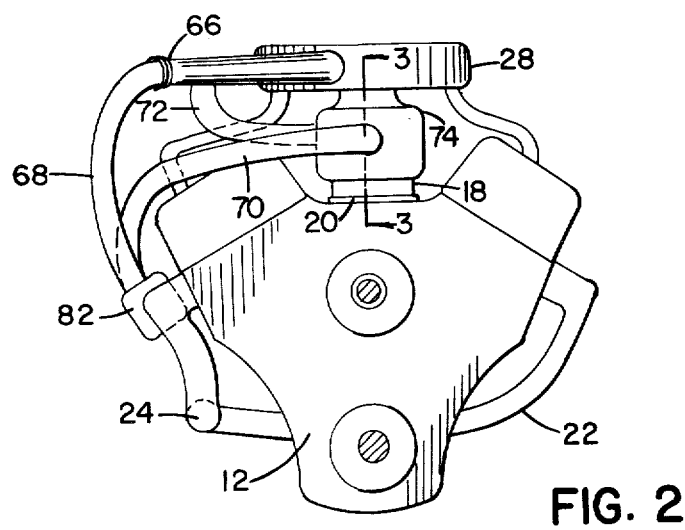
FIG. 2 is a sectional view taken substantially along line 2—2 of FIG. 1 to show the engine rearwardly of the radiator fan with the preheating elements.

Referring now to the drawings and FIG. 1 particularly, a conventional automobile internal combustion engine 10 is illustrated, which for illustration purposes is shown as a V-8 engine, although it should be understood that the invention is adaptable to any other form of I.C. engine. Typically the engine includes an engine block 12, which together with the cylinders are cooled by water circulating through jackets and flowing through a radiator 14. An air moving fan 16 driven by the engine or by an electrical source draws air through the radiator to remove the heat from the water, thereby heating the air. A carburetor 18 is mounted on an intake manifold 20 that communicates the air and fuel mixture to the combustion chambers of the cylinders, and exhaust manifolds 22 and 24 conduct the hot exhaust gases from the cylinders to an exhaust pipe 26. Mounted above the carburetor 18 is the air cleaner assembly 28 which filters the air entering the carburetor.

Figure 3:
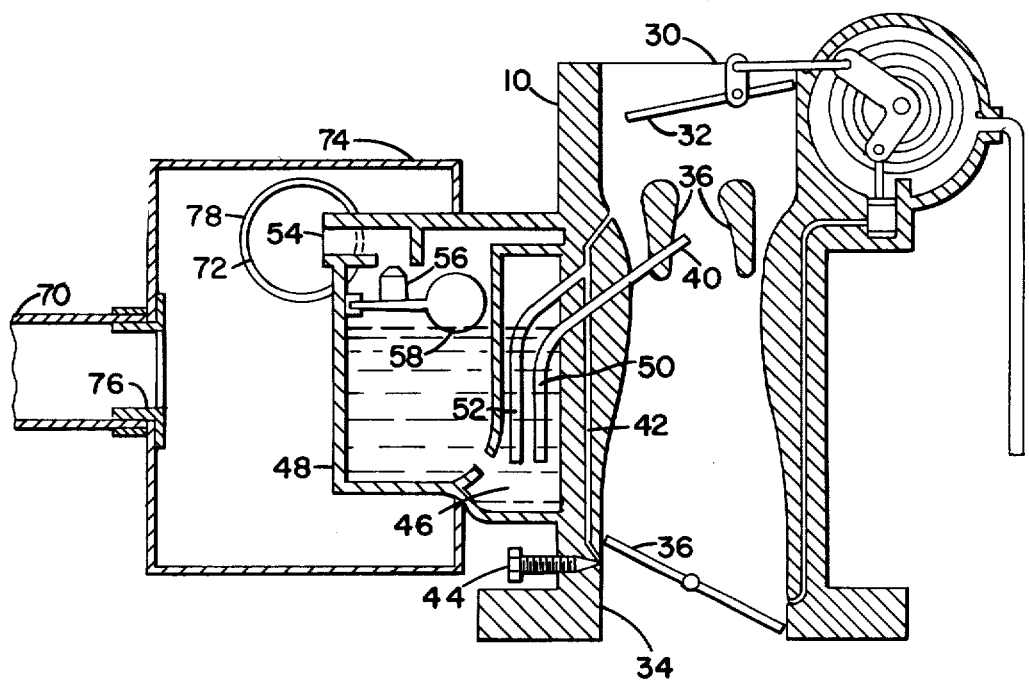
FIG. 3 is a cross sectional view throught the carburator and the heat plenum chamber greatly enlarged for purposes of illustration.

As illustrated in FIG. 3, the carburetor 18 conventionally includes an air inlet 30 at the upper portion within which an automatically controlled choke valve 32 is hinged and a lower mixing portion 34 in which a throttle valve 36 is pivotably mounted. A venturi 38, in which the main fuel jet 40 is positioned, is located between the choke valve 32 and the throttle valve 36. An idling tube 42 leads down the wall of the carburetor body into the vicinity of the throttle valve and the fuel-/air mixture ratio is controlled by an air bleed adjustment screw 44. The main fuel jet 40 and the idling tube 42 communicate with fuel 46 in the carburetor fuel reservoir 48 by means of respective conduits 50 and 52. Fuel from the fuel tank (not illustrated) is pumped into the inlet 54 of the reservoir 48 when a needle valve 56, controlled by a float 58, opens the inlet in response to the fuel level in the reservoir.

In accordance with the preferred form of the invention a pair of heat riser boxes or jackets 60 and 62 are clamped to the exhaust manifold 24, although either or both jackets 60,62 may be clamped to the manifold 22 with the same effect. It is current practice to have one heat riser secured to the manifold of conventional engines and to have a conduit lead from the jacket to the air cleaner assembly to an opening 64 behind the front of the air cleaner inlet 66. In the present invention this prior art practice is effectively followed since one of the heat riser jackets 62 is connected to a conduit 68 which is directed into the front of the inlet portion 66 of the air cleaner assembly and the latter is closed about the conduit. A conduit 70 is connected in flow communication with one end of the heat riser jacket 60 and a conduit 72 is connected at one end to the opening 64 in the air cleaner assembly.

Positioned about and clamped to a major portion of the carburetor fuel reserve bowl 48 is a housing 74 which comprises a heat plenum or chamber. The housing may be of any conventional material and shaped so that the part of the fuel reserve bowl clamped thereto is encased therein and spaced from the walls of the housing which is sealed about the edges. Formed in the plenum housing are two openings 76 and 78 for securely receiving the other ends of the respective conduits 70 and 72, the relative locations of the openings being non-critical. Thus, the heated air from the heat riser 60 via conduit 70 enters the plenum 74 to preheat the fuel in the reservoir 48 and leaves through the conduit 72 to thereafter enter the air cleaner where it mixes with the preheated air from the heat riser 62.

Figure 4:
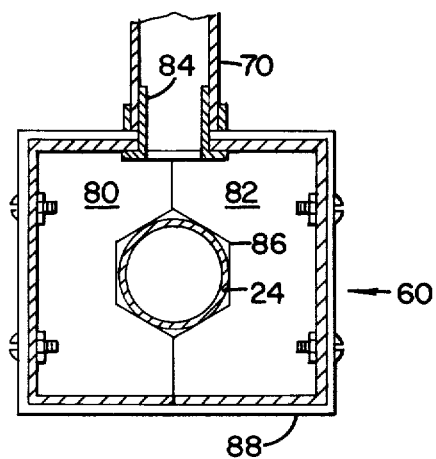
FIG. 4 is a cross sectional view taken through a heat riser box substantially along line 4—4 of FIG. 1.

As shown in FIG. 4 the heat riser jacket 60 comprises a pair of half box members 80 and 82 positioned about the manifold 24 and fitted with a nipple 84 in an aperture formed in the top at the connecting point of the box members. The members 80 and 82 have respective openings which form a hexagonal opening 86 positioned about and slightly larger than the manifold 24. Thus, air may flow into the jacket through the space provided between the opening 86 and the manifold, be heated by contact with the manifold and flow to the plenum 74. Strap clamps 88 secure the members 80 and 82 together. To minimize heat loss fiberglass insulation covered by duct tape (not illustrated) may be applied about the assembly and also all the conduits. The jacket 62 may be of the same construction as the jacket 60.

It should be clear that the plenum 68 is merely a simple heat exchanger for soaking the fuel in the reserve bowl 48 to preheat this fuel prior to its entering the carburetor preheated air stream. As previously stated measured results indicate that the temperature of the air stream and the fuel in the reservoir range from approximately 145° F. to 230° F. Under these conditions a reduction in fuel consumption in the order of 34% has been realized during city driving.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus described the nature of the invention, what is claimed herein is:

1. In an internal combustion engine having a carburetor with fuel inlet means and air inlet means for metering fuel and air to an intake manifold, a liquid fuel reservoir adjacent said inlet means for maintaining a small supply of fuel for entry into said fuel inlet means, an air cleaner assembly including a housing having an inlet and an outlet communicating with said carburetor air inlet means, and an exhaust manifold, the improvement comprising a housing defining a plenum chamber positioned about and encapsulating at least a portion of said fuel reservoir, said housing including inlet means and outlet means for said plenum chamber, heat transfer means on said exhaust manifold for producing heated air, means communicating said heated air to the inlet means of said plenum chamber, and means communicating the outlet means of said plenum chamber with the inlet of said air cleaner assembly.

2. In an internal combustion engine as recited in claim 1 including second heat transfer means on said exhaust manifold for producing heated air, and means communicating said heated air to the inlet of said air cleaner assembly.

3. In an internal combustion engine as recited in claim 2 wherein each heat transfer means comprises a jacket secured about said exhaust manifold and means for communicating air into said jacket and over said manifold.

* * * * *